United States Patent
Mattox, Jr. et al.

(10) Patent No.: US 9,703,806 B2
(45) Date of Patent: Jul. 11, 2017

(54) USER PHOTO HANDLING AND CONTROL

(75) Inventors: Gregory T. Mattox, Jr., Bellevue, WA (US); Jad Honein, Redmond, WA (US); Elia Karagiannis, Seattle, WA (US); Erin Stewart, Redmond, WA (US); David Johnson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1634 days.

(21) Appl. No.: 12/141,058

(22) Filed: Jun. 17, 2008

(65) Prior Publication Data

US 2009/0313254 A1    Dec. 17, 2009

(51) Int. Cl.
*G06F 17/30* (2006.01)
*G06F 21/62* (2013.01)
*G06F 17/00* (2006.01)

(52) U.S. Cl.
CPC .... *G06F 17/3028* (2013.01); *G06F 17/30244* (2013.01); *G06F 17/30864* (2013.01); *G06F 21/6263* (2013.01)

(58) Field of Classification Search
CPC .......... G06F 17/30864; G06F 17/3028; G06F 17/30244; G06F 21/6263
USPC .......................................... 707/999.009, 790
See application file for complete search history.

(56) References Cited

U.S. PATENT DOCUMENTS

| | | | |
|---|---|---|---|
| 6,542,936 B1 * | 4/2003 | Mayle et al. | 709/250 |
| 6,721,802 B1 | 4/2004 | Wright et al. | |
| 6,738,155 B1 | 5/2004 | Rosenlund et al. | |
| 7,068,309 B2 | 6/2006 | Toyama et al. | |
| 7,530,021 B2 * | 5/2009 | Cheng et al. | 715/753 |
| 7,606,865 B2 * | 10/2009 | Kumar et al. | 709/206 |
| 8,694,577 B2 * | 4/2014 | D'Angelo | G06Q 10/10 705/1.1 |
| 2002/0161659 A1 | 10/2002 | Veilleux et al. | |
| 2003/0001846 A1 | 1/2003 | Davis et al. | |

(Continued)

OTHER PUBLICATIONS

"Deploying SharePoint Portal Server 2003 Shared Services at Microsoft", Feb. 3, 2004, Microsoft Technet, Microsoft Corporation.

(Continued)

*Primary Examiner* — Kannan Shanmugasundaram

(57) ABSTRACT

Architecture for centralized photo storage for user profiles with consent and cardkey system integration. A picture picker can connect to a cardkey/security badge photo system to allow users to choose from badge photos. Consent is also captured by the picker to allow user photos to be used in other applications. Other applications can interact with the photo storage using standard web services and APIs for the user profile and user profile change log services. Centralized storage and insured accessibility enable applications to consume from the photo storage. The photo storage can also function as a virtual directory with distributed storage as utilized for geographical deployments. Extensions of the photo storage can include an add-in for a personal information manager application and a management agent for web-based collaboration and document management to copy photos from/to other directory structures.

20 Claims, 11 Drawing Sheets

(56) References Cited

U.S. PATENT DOCUMENTS

| | | | |
|---|---|---|---|
| 2004/0099731 A1* | 5/2004 | Olenick | G07F 17/26 235/380 |
| 2004/0215793 A1* | 10/2004 | Ryan et al. | 709/229 |
| 2004/0267625 A1 | 12/2004 | Feng et al. | |
| 2005/0192008 A1 | 9/2005 | Desai et al. | |
| 2005/0234864 A1 | 10/2005 | Shapiro | |
| 2007/0067297 A1 | 3/2007 | Kublickis | |
| 2008/0104495 A1* | 5/2008 | Craig | 715/205 |
| 2008/0172407 A1* | 7/2008 | Sacks | 707/102 |
| 2008/0172458 A1* | 7/2008 | Middleton et al. | 709/203 |
| 2008/0215967 A1* | 9/2008 | Abrams et al. | 715/255 |
| 2009/0070334 A1* | 3/2009 | Callahan et al. | 707/9 |
| 2009/0106676 A1* | 4/2009 | Brezina | H04M 15/00 715/763 |
| 2010/0269158 A1* | 10/2010 | Ehler et al. | 726/4 |
| 2012/0098638 A1* | 4/2012 | Crawford | G06F 21/34 340/5.6 |
| 2014/0047559 A1* | 2/2014 | Vera | G06Q 10/10 726/28 |

OTHER PUBLICATIONS

Koch, et al., "User Representation in E-Commerce and Collaboration Applications", Proceedings on 16th Bled eCommerce Conference, Jun. 2003.

"Building Applications with BackOffice Server 4.5", Microsoft Technet, Microsoft Corporation, 2008.

"Microsoft Web Enterprise Portal", Technical White Paper, Jan. 2004, Microsoft.

* cited by examiner

UPLOAD PHOTO

PROVIDE A PHOTO TO HELP USERS RECOGNIZE YOU AT MEETINGS AND EVENTS. YOU CAN USE THE PHOTO THAT APPEARS ON YOUR CARDKEY OR UPLOAD A DIFFERENT PHOTO. ALL COMMON PICTURE FORMATS ARE SUPPORTED AND IF NECESSARY YOUR PHOTO WILL AUTOMATICALLY BE RESIZED UPON UPLOAD.

I WANT TO INCLUDE MY PHOTO IN THE COMPANY PEOPLE PHOTO DIRECTORY. I UNDERSTAND THAT INCLUSION IN THE PHOTO DIRECTORY IS NECESSARY FOR DISPLAYING PHOTO ON MY SITE. I ALSO UNDERSTAND THAT MY PHOTO MAY APPEAR IN OTHER APPLICATIONS USING THE COMPANY PHOTO DIRECTORY SUCH AS PROJECT OR ORGANIZATION FACEBOOKS.

NOTE: IMAGES POSTED TO COMPANY SYSTEMS REMAIN SUBJECT TO COMPANY POLICIES REGARDING TECHNOLOGY AND CONTENT.

☐ ALLOW PHOTO USE    ☒ DO NOT ALLOW PHOTO USE

OK    CANCEL

*FIG. 4*

USER PHOTO HANDLING AND CONTROL

BACKGROUND

Websites that post user photos and personal information are gaining enormous popularity. At the corporate level, similar network servers can also include user profiling and personal sites. The user profiling feature allows users to self profile and provides a photo so other users can identify the self-profiled user when people searching or using social computing applications. In one implementation, the photo field is a URL (uniform resource locator) field that required users to provide well formed and accessible URLs. Oftentimes, a user will unknowingly provide a URL that points to locations/files which are only accessible by that user. This means that when another user visits the user profile that user is not able to view the photo.

One limited solution built a custom photo picker that copied the photo from the given URL and placed the photo on a file share accessible to everyone, and then configured the profile to use the copy, thereby creating a form of centralized photo storage. Another limited solution stored the photo on the personal site which reintroduced the inaccessibility problem. Two additional limitations included the lack of support for connecting to a cardkey/security badge system to allow users to use previously captured photos, and the ability to capture and provide photo usage consent. Capturing photo consent is a major legal concern when deciding to use the user photos in other collaboration applications like such as in personal information manager applications, communications programs, and the like.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes centralized photo storage for user profiles with consent and cardkey system integration. The photo storage solution solves the decentralized storage problem by storing the photos in a photo library in the same site as a user profile page using a custom picture picker application ("picker"). The picker can also connect to a cardkey/security badge photo system to allow users to choose badge photos. The cardkey/security badge system connectivity and consent capturing is configurable. Consent is also captured by the custom picker to allow user photos to be used in other applications.

Other applications can interact with the photo storage using standard web services and APIs for the user profile and user profile change log services. Centralized storage and ensured accessibility enables applications to consume from the photo storage.

The photo storage can also function as a virtual directory with distributed storage as desired for geographical deployments. Extensions of the photo storage can include an add-in for a personal information manager application and a management agent for web-based collaboration and document management to copy photos from/to other directory structures.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates a screenshot of a consent panel where the user can management consent related to other viewing the user photo.

DETAILED DESCRIPTION

Figure 1:
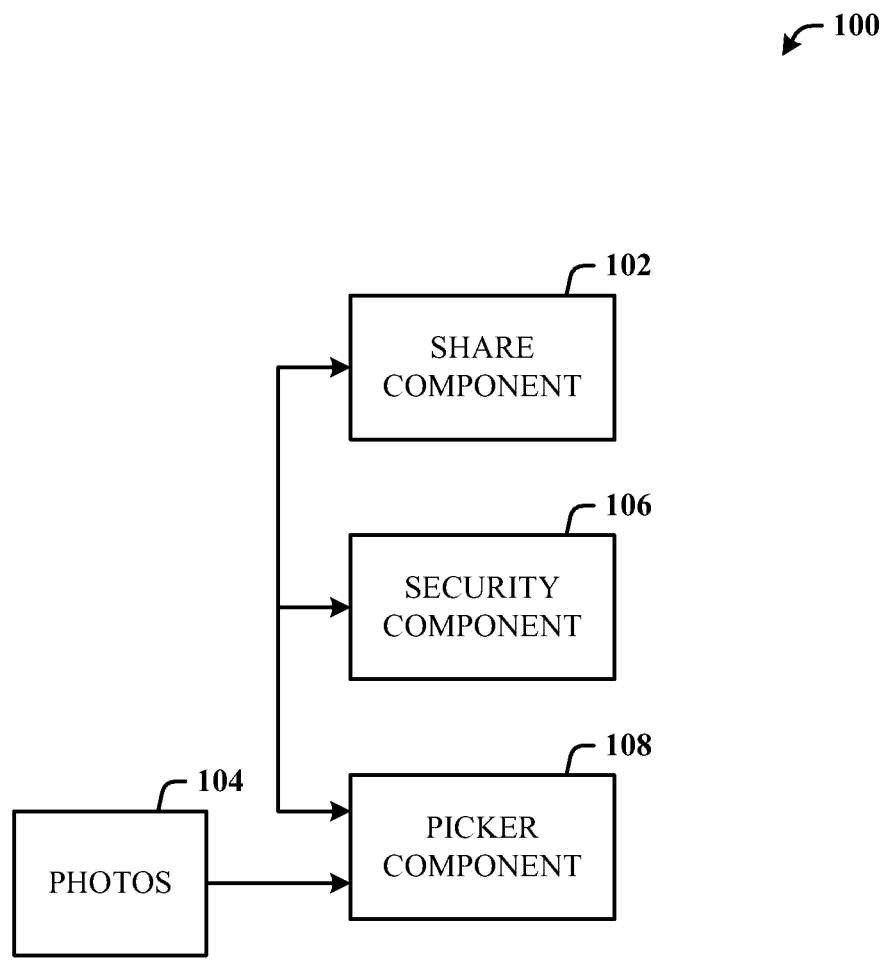
FIG. 1 illustrates a computer-implemented photo management system in accordance with the disclosed architecture.

The disclosed architecture is centralized photo storage for web client user profiles with consent and cardkey system integration. The architecture has configurable storage location, system integration, and consent requirements.

The displaying of photos is a common request for line-of-business (LOB) and other applications that wish to offer richer user experiences by using user photos. As LOB applications begin to rely on this user data, there is an expectation that the data (or service) is reliable and performant.

The disclosed architecture solves the decentralized storage problem by storing the photos in a collaboration and data management (CDM) platform (e.g., SharePoint™ by Microsoft Corporation) picture library in the same site as the profile page using a custom picture picker (picker component). The custom picker also connects to a cardkey/security badge photo system to allow users to choose badge photos. Consent is also captured by the custom picker to allow user photos to be used in other applications.

Other applications can interact with the picker architecture using standard web services and APIs for the user profile and user profile change log services. Centralized storage and ensured accessibility enables applications to consume from the CDM platform. Both the cardkey/security badge system connectivity and consent capturing is completely configurable.

The CDM platform can also function as a virtual directory with distributed storage as utilized for geographical deployments. Extensions of the CDM architecture include an add-in for a PIM (personal information manager) application and a directory agent for copying photos.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented photo management system 100 in accordance with the disclosed architecture. The system 100 includes a share component 102 for storing user photos 104 as shared items for collaboration processes, a security component 106 for applying security to the user photos according to consent criteria, and a picker component 108 for managing state of the user photos in the share component based on the consent criteria.

The picker component 108 processes the state to add a photo to or remove a photo from the share component 102. The picker component 108 includes a user interface and shared components for uploading a photo from a card key database to the share component 102 and is accessible via a delegate control on a user profile page.

External application can access the user photos via a profile web service or a search query web service and internal applications can access the user photos via a profile service object model or a search query service object model. The security component 106 ensures that the requester has the appropriate permissions.

Figure 2:
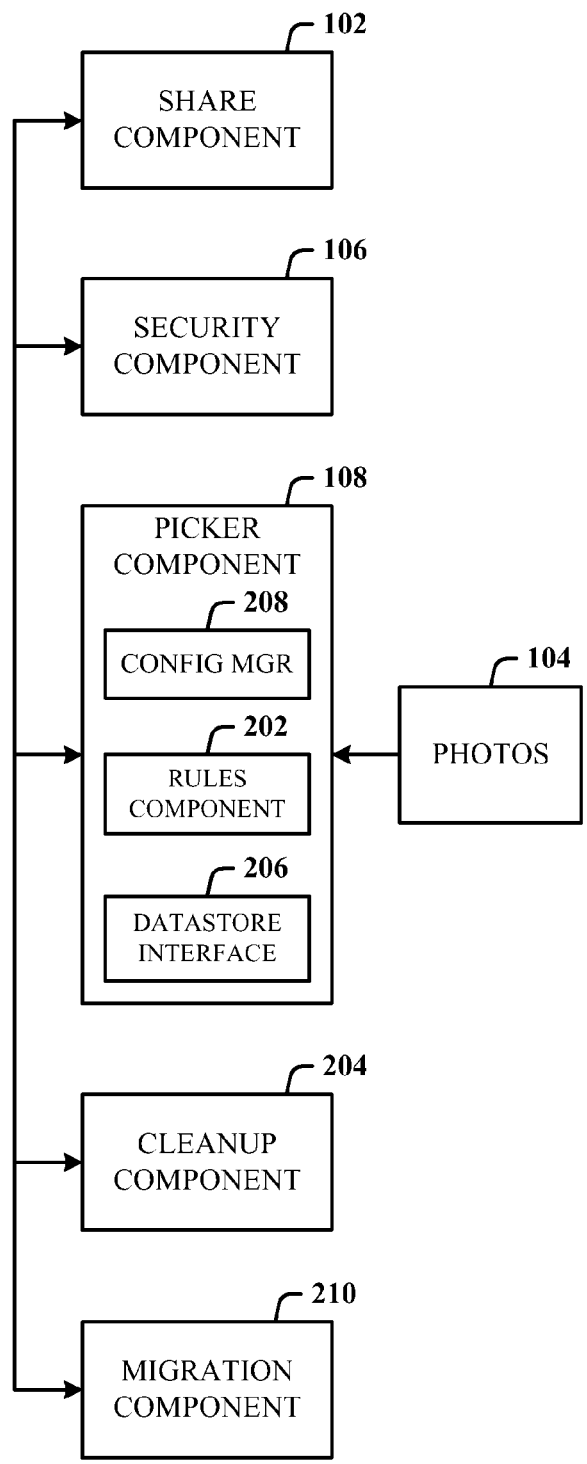
FIG. 2 illustrates an alternative embodiment of a photo management system.

FIG. 2 illustrates an alternative embodiment of a photo management system 200. The system 200 includes the share component 102 for storing the user photos 104 as shared items for collaboration processes, and the security component 106 for applying security to the user photos in the share component according to consent criteria. The picker component 108 reads a user profile property to determine if the consent has been given. The picker component 108 manages state of the user photos 104 in the share component 102 based on the consent criteria, where the state defines if the photo is added to or removed from the share component 102.

The system 200 can further include a rules component 202 as part of the picker component 108 for populating the store component 102 with the user photos 104 according to business rules. For example, a business rule can be a rule imposed by an enterprise administrator for global or group control of photos such that certain photos will not be allowed to be exposed. The users can individually designate if a user photo will be uploaded and exposed to sharing by the share component 102; however, if a need arises, the administrator can enforce a global rule that imposes additional security or overrides user consent permissions on some or all of the photos in the share component 102.

A cleanup component 204 interacts with CDM APIs to determine if an event has occurred, such as deletion of a user profile after which the deletion of a user photo from the share component 102 can be performed. In other words, if the user leaves the company, for example, the photo can be automatically deleted from the share component 102. The picker component 108 includes a user interface and shared components, which can be embodied as part of a datastore interface 206 for uploading a photo from a card key database or a custom datastore to the share component 102. The picker component 108 is accessible via a delegate control on a user profile page. The picker component 108 also includes a configuration manager 208 for reading configuration data from and writing configuration data to a collaboration list.

A migration component 210 is provided that handles the change-over from legacy (or earlier version) systems to new systems. This includes migrating pictures from the file share to the appropriate photo library under a personal site, according to the business rules. The user picture is only migrated if the business rules are met (e.g., consent is provided). All pictures in the photo library can be compressed images (e.g., JPEG). Thus, the migration component 210 can compress photos when moving from the file share to the picture library. It is noted that the picture picker can also perform compression. The migration component 210 can query the storage structure (e.g., Active Directory™ by Microsoft Corporation) to find the region the user is in. The structure can be CDM or a configuration file that represents the CDM. Thus, the structure can be CDM or a non-CDM system/structure. With this information, the migration component 210 can determine what picture list or CDM to upload the picture to.

The migration component 210 can include the following components: a helper class for retrieving the domain having the alias (a fallback plan can be to query a share farm in order to get the domain), XML mapping files for regions and domains, configuration list (shared from above), GDI (graphics device interface) Helper Class (shared from above), Cardkey Picture Helper Class (shared from above), and Profile Helper Class (shared from above). After migration is complete, a picture preference property can be unmapped from the CDM platform. An application definition file can be updated and the picture preference removed.

Figure 3:
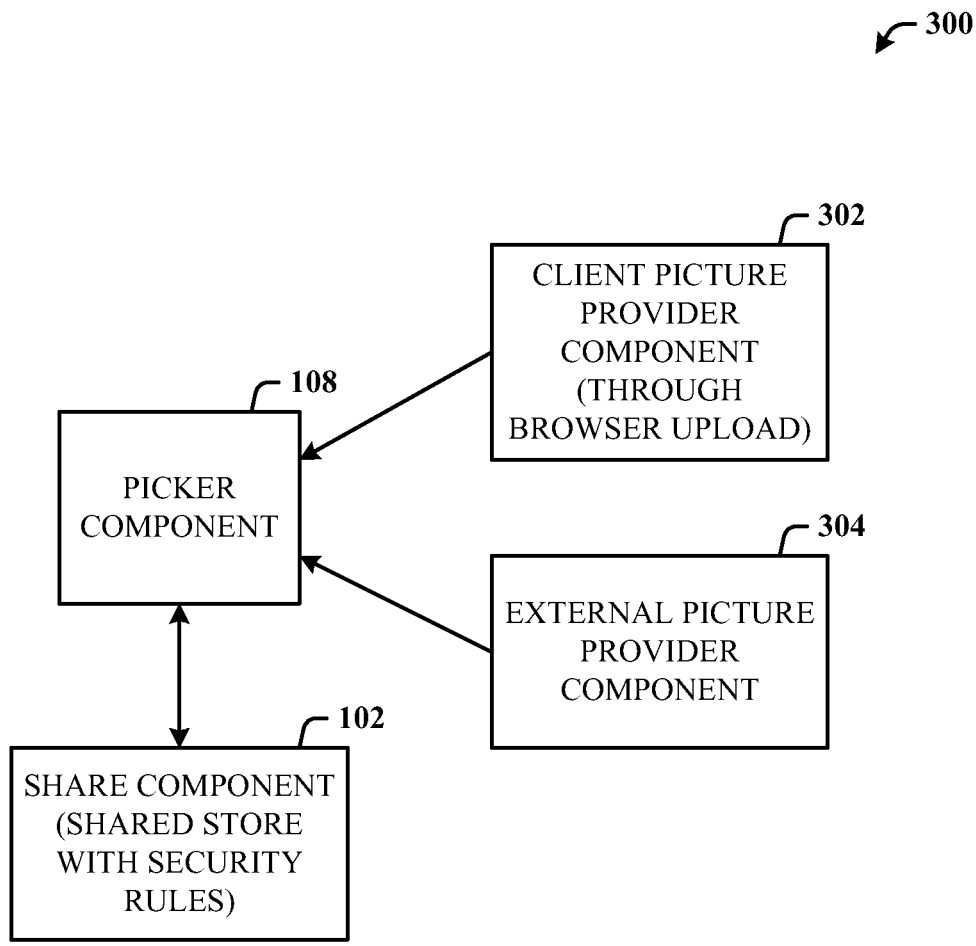
FIG. 3 illustrates a system of providers that can interface to the picker component.

FIG. 3 illustrates a system 300 of providers that can interface to the picker component 108. A client picture provider component 302 provides the ability to the user to upload a photo from any location to which the user client machine has access. The location can be the local drive or any network share with the least read access. The client provider component 302 facilitates the photo upload through a client browser, for example. An external picture provider component 304 provides pictures from an external data source. In data source can be a SQL (structured query language) server that stores the cardkey photo and/or employee badge photos, for example.

The picker component 108 includes a user interface via which the user has the ability to use a cardkey photo or upload a photo that is accessible from the client machine. The share component 102 is a photo share storage for storing the photos on a shared location with specific security rules. In one implementation, an application pool account has write permission to the share component 102. On the other hand, all authenticated users have read permission to the share component 102. The share component can be picture library, for example.

FIG. 4 illustrates a screenshot of a consent panel 400 where the user can management consent related to other viewing the user photo.

Figure 5:
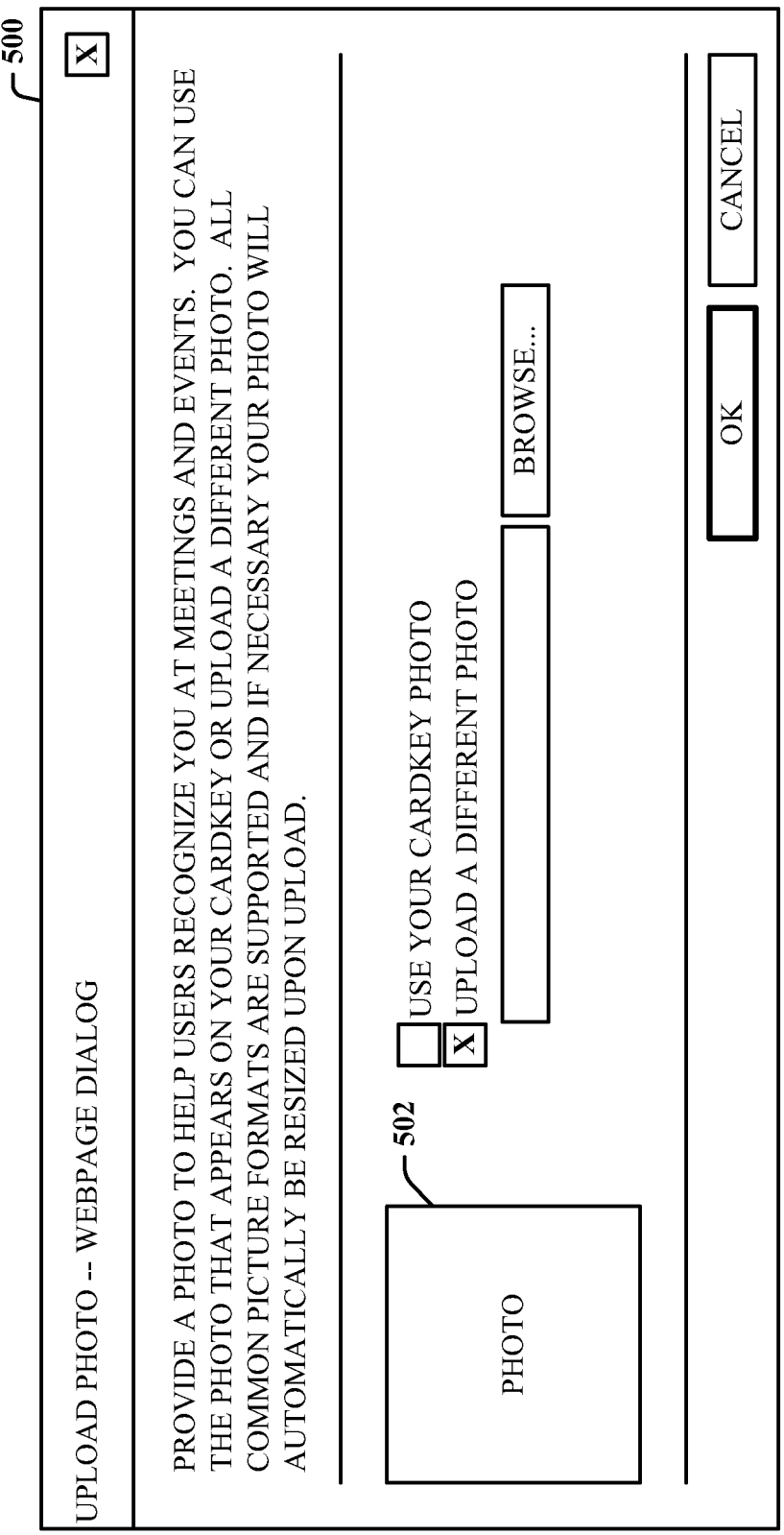
FIG. 5 illustrates a screenshot of a dialog panel for selecting a photo for upload to the share.

FIG. 5 illustrates a screenshot of a dialog panel 500 for selecting a photo 502 for upload to the share. Here, the user has will select a photo other than a cardkey photo. Once selected, the photo 502 will be displayed for viewing.

Photos can be accessed or consumed by applications that are internal or external to a collaboration and document management (CDM) platform. Generally, applications external to the CDM platform that want to consume photos can request photos using either the profile shared service web services, or by using the search shared service web services. Applications internal to the CDM platform that want to consume photos can request photos using either the profile shared service object model, or by using the search shared service object model (OM).

Figure 6:
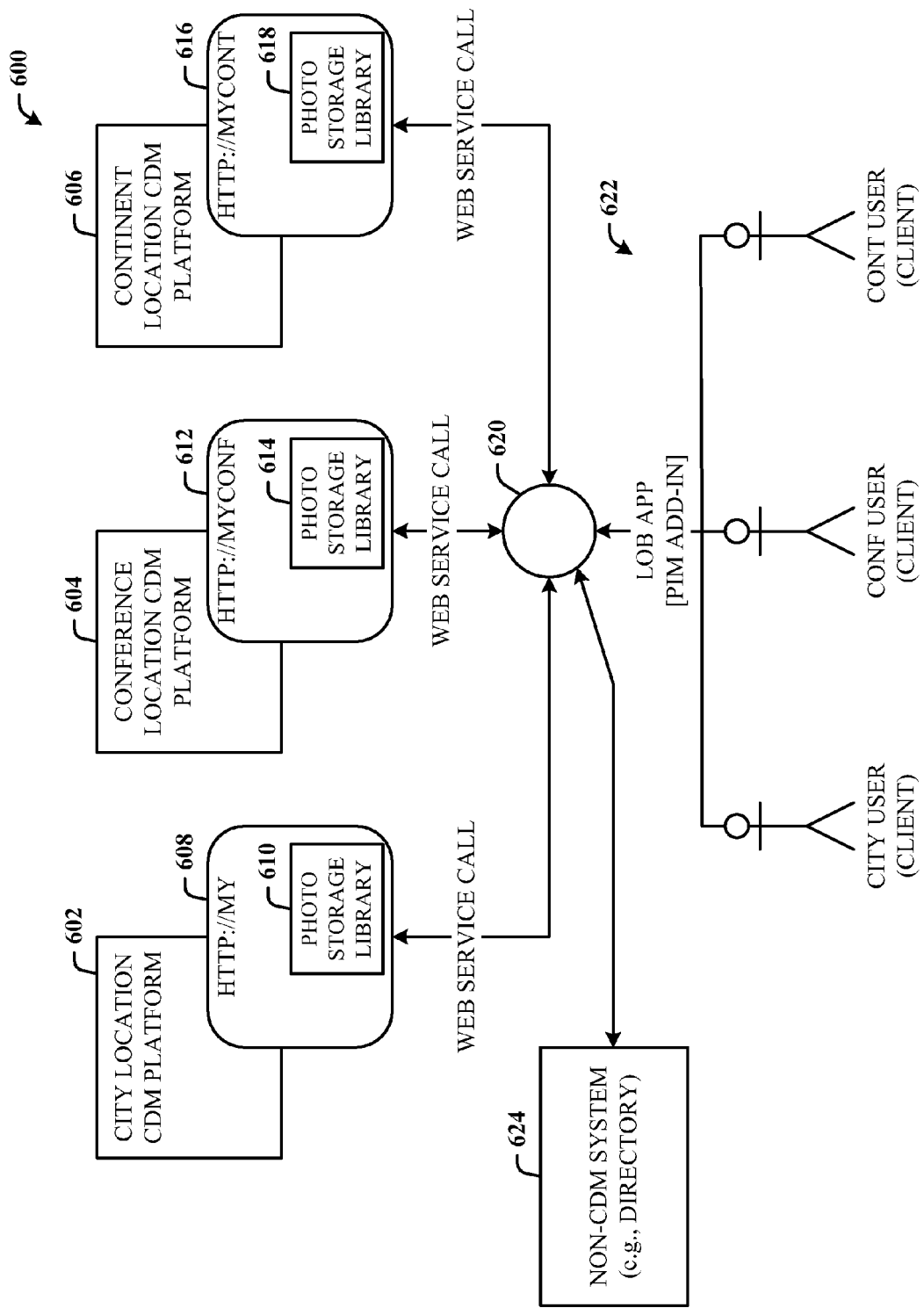
FIG. 6 illustrates an exemplary system that employs a distributed model for an external application requesting photo data from a photo directory.

FIG. 6 illustrates an exemplary system 600 that employs a distributed model for an external application requesting photo data from a photo directory. Applications external to a CDM platform can use web services to access the photo data. Here, three CDM platforms are shown: a city location platform 602 for a corporate location, a conference platform 604 for a conference location, and a continent platform 606 for a corporate location on a different continent.

The city location platform 602 includes a personal site 608 having a user profile that further is associated with a city location photo storage library 610 that exposes photos for use at the city location according to user consent criteria. Similarly, the conference location platform 604 includes a personal site 612 and associated user profile page that further is associated with a conference location photo storage library 614 that exposes photos for use at the conference location according to user consent criteria. Further, the continent location platform 606 includes a personal site 616 and associated user profile page that further is associated with a continent location photo storage library 618 that exposes photos for use at the continent location according to user consent criteria.

A line-of-business (LOB) application 620 includes a PIM add-in via which corresponding users 622 can access the photo data. For example, a city user can access the LOB application 620 via the PIM add-in to access the personal site 608, associated user profile page, and city photo storage library 610, a conference user can access the LOB application 620 via the PIM add-in to access the conference user personal site 612, associated conference user profile page, and conference photo storage library 614, and a continent user can access the LOB application 620 via the PIM add-in to access the user personal site 616, associated user profile page, and continent photo storage library 618, all of which are shown using a corresponding web service call for the site access.

The LOB application 620 can either use the profile web service or the search query web service. There are advantages to both, based on the quantity and planned use of the data. If the application 620 is planning to request photo information for a large number of users at the same time (and photos are being indexed) then that application 620 can use the search service to return that data. If the application 620 is planning to request photo information for a single user (or small number) then the application 620 can use the profile web service to return the photo data. The profile web service can also be employed when needing additional information about users that is not being indexed by the search service.

Asking a user client can be a more straightforward approach, provided that the client is installed on the client machine and the user has visited their profile site. When these conditions hold true, using the client API, calling ClientCDMURL.GetMySiteURL( ) will return the site location of that user's profile site. A next step is to append the web service call to that URL. Since this is the user's site, the user is guaranteed to have the correct security permissions to access the web service.

Alternatively, if the user machine does not have the client installed or the user has not visited their personal site, then the LOB application 620 can read the client operating system (OS) registry. In other words, if desired, then OS APIs can be employed to read the OS registry for the correct site URL to use.

Once the application 620 has the site URL, web service extension can be appended to access the web service. The LOB application 620 uses only the profile or search web services to retrieve photo data.

Note that the LOB application 620 finds the location of the web service since the web service is already connected to the correct CDM platform. This means the LOB application 620 does not need to know which region the user belongs to or which CDM contains the requested data, since that is determined when the registry key is created. This also helps to ensure faster recall, since most photos the user will need to see belong to users in the region.

As illustrated, the clients 622 can access a non-CDM system 624 where photo storage can be in a directory, for example.

Figure 7:
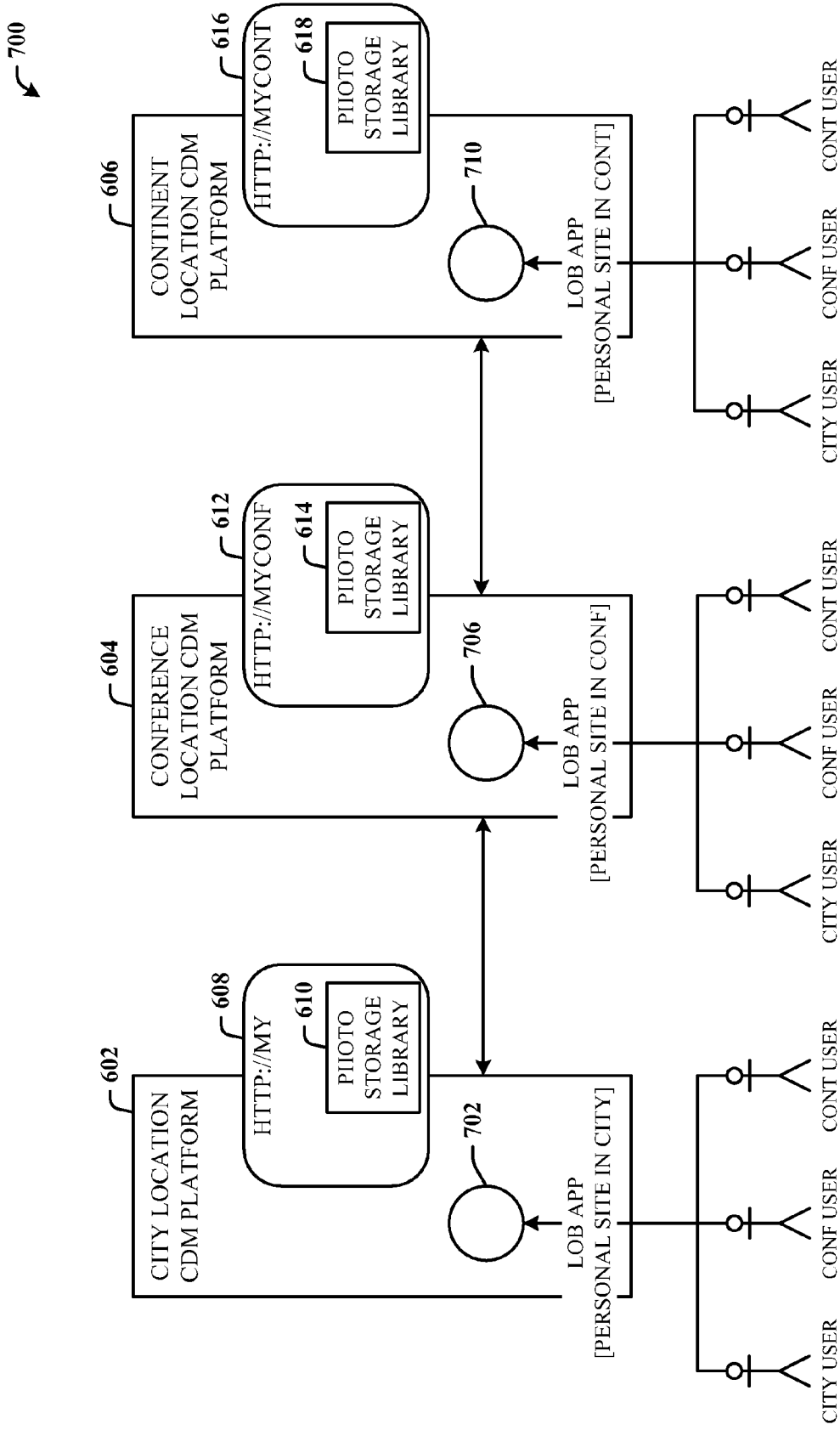
FIG. 7 illustrates an exemplary system that employs internal applications that request photo data from a photo directory.

FIG. 7 illustrates an exemplary system 700 that employs internal applications that request photo data from a photo directory. Note that since internal LOB applications use the OM through the personal site, the personal site will already be connected to the correct CDM platform. This means the LOB application does not need know about which region the user belongs to, since the personal site is requesting the data from its CDM platform. This also ensures faster recall since the personal site is already connected to the CDM platform and the OM is faster than web services.

The internal applications can either use the profile service OM or the search query service OM. There are advantages to both, based on the quantity and planned use of the data. If the application is planning to request photo information for a large number of users at the same time (and photos are being indexed) then that application should use the search query service to return that data. If the application is planning to request photo information for a single user (or small number) then the profile service OM can be used to return this data. A profile service can be used if additional information about users is requested that is not being indexed by the search service.

Here, each of the three users (city user, conference user and continent user) can request photo data from the city location CDM platform 602 via a first LOB application 702 that provides access to the photo library 610 over a shared services connection 704. The first LOB application 702 is shown as internal to the city location CDM platform 602. Similarly, each of the three users (city user, conference user and continent user) can request photo data from the conference location CDM platform 604 via a second LOB application 706 that provides access to the photo library 614 over a shared services connection 708. The second LOB application 706 is shown as internal to the conference location CDM platform 604. Further, each of the three users (city user, conference user and continent user) can request photo data from the continent location CDM platform 606 via a third LOB application 710 that provides access to the photo library 618 over a shared services connection 712. The third LOB application 710 is shown as internal to the continent location CDM platform 606.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
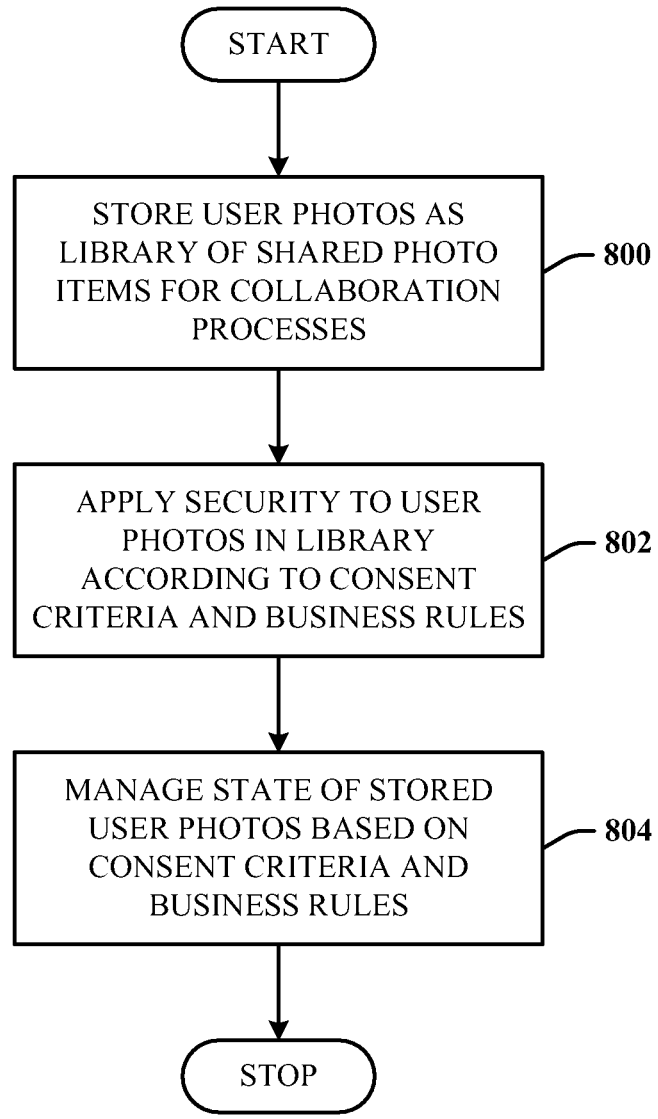
FIG. 8 illustrates a computer-implemented method of managing photos.

FIG. 8 illustrates a computer-implemented method of managing photos. At 800, user photos are stored as a library of shared photo items for collaboration processes. At 802, security is applied to the user photos in the library according to consent criteria and business rules. At 804, state of the stored user photos is managed based on the consent criteria and business rules.

The method can further comprise deleting a user photo in response to deletion of a user profile, and providing access to a cardkey system for upload of a security photo as a shared photo item. Additionally, the method can further comprise exposing access to the user photos using an application that employs a profile web service or a search query web service, exposing access to the user photos using an application that employs a service object model, and uploading user photos based on accessible photo locations of a client provider and based on an external data source based on an external photo provider. The method can also include storing and retrieving user photos based on current user information, and capturing photo consent using a picker component to process access to the photos by other applications.

Figure 9:
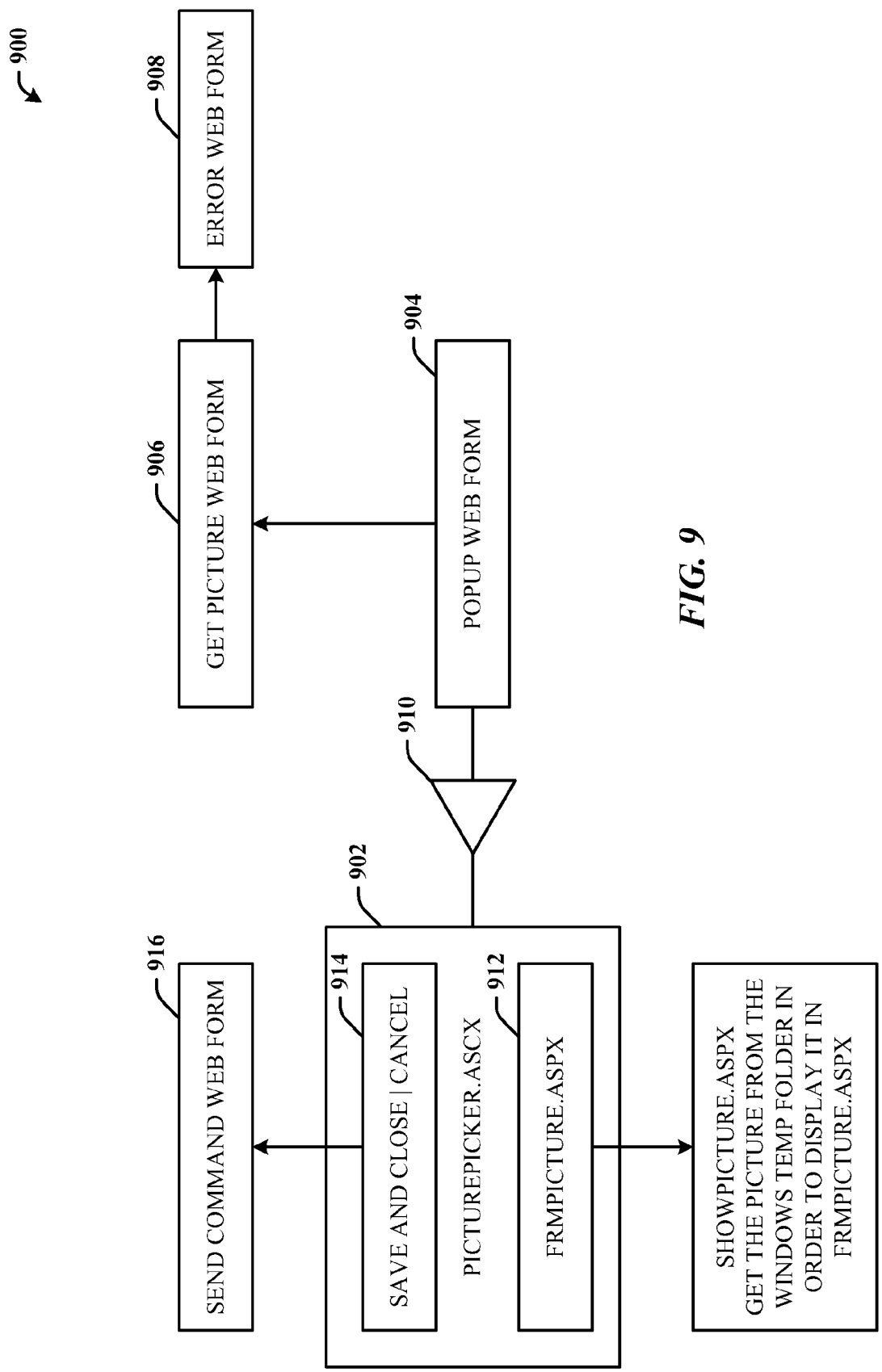
FIG. 9 illustrates an exemplary diagram between entities of the picker component.

FIG. 9 illustrates an exemplary diagram 900 between entities of the picker component. As described herein, the picker component can be referred to as a picture picker. The diagram 900 is described in the context of an ASP.net implementation; however, it is to be understood that other implementations can be employed. The picture picker component is the main UI component that includes a collection of UI elements which the end user interacts with in order to upload a profile picture, whether a cardkey image or a custom image, for example.

A picker web user control (picturepicker.ascx) 902 is presented that facilitates getting a picture (photo) from a cardkey system. The user can enter a link (e.g., URL) to the location of the cardkey source. A popup web form 904 (e.g., picturepickerpopup.aspx) is presented that allows request (asynchronous) of the cardkey photo from the cardkey database. A get picture web form 906 (e.g., getcardkeypicture.aspx) receives the request and also interacts with an error web form 908 to process any errors. On error, flow is redirected to the error web form 908 (e.g., showerror.aspx) which contains logic to render the error message on-the-fly. By clicking OK, as indicated at 910, the picture whether loaded or a cardkey photo, is saved to an OS temporary folder. A frame picture web form 912 (e.g., frmpicture.aspx) is then calls the show picture method (showpicture.aspx) to get the picture from the temporary folder to display the picture in the frame picture web form 912. The user can then interact with the picker web user control 902 to Save and Close or Cancel 914, in either case which the script sends a synchronous commend to a send command web form 916 (e.g., sendcommand.aspx) to move the selected picture from the temporary folder to the picture library, or delete the picture.

The picker component stores the images in a picture library rather than on a file share. Additionally, the picker can use AJAX (asynchronous JavaScript and XML—a browser script) calls in order to retrieve the picture from the user or from the cardkey system.

The picker component impersonates to the application pool user for the following: a query the cardkey database, store the user selection into the OS temporary folder and, move and delete the picture from the OS temporary folder.

The picker component can include the following components: a configuration list. Access to the list can be implemented in a configuration manager shared API. The configuration manager allows the reading and writing of configuration data to a CDM list, and contains an API for retrieving and setting configuration values by using name/value pairs.

The following examples of properties that can be configurable: ConfigurationCacheDuration, PictureWidth, PictureHeight, PawnUrlName (NoPicUrl), CardKeyServer, CardKeyDataBase, FileToolargeErrorMesg, InvalidFormatErrorMesg, GenericErrorMesg, CardKeyConnectionErrorMesg, CardKeyErrorMesg, InvalidPathErrorMesg, ErrorLoggingLevel, ConsentRequired (ability to turn off the consent functionality), ConsentMessage (ability to change display text), ConsentAllowText (allow photo use), ConsentDenyText (do not allow photo use), RemoveTextRequired (ability to turn off the remove confirmation dialog box), RemoveText (ability to remove photo), UserAssistantText, MaxFileSize, PictureLibraryName (region picture library location), CardKeyQuery, JPEG Compression Quality, ConsentProperty (ConsentProfileProperty [PicturePreference as default]), and PictureCeanupJobChangeToken.

A GDIHelper class contains a method for resizing and saving bitmap images, and is used to save images into streams as well as change the format of an image to a constant format used by the system. This class can perform the resizing of images uploaded, and converts all the images to a format (e.g., JPEG) for upload.

A CardKeyHelper class contains methods for retrieving cardkey images from the cardkey system. This helper class contains all the logic for the database calls, and simplifies retrieving pictures from the cardkey system.

A ProfileHelper class contains methods which can be used to wrap the CDM profile web service. This class includes methods to help set the profile image as well as retrieve the current profile image, and includes methods for setting other needed profile properties. This can be implemented as a general SetProfileProperty method with the property name and value passed in. The profile picture can be stored in the picture library in the CDM system. The images can also be stored on a file share and then migrated to the picture library. This helper class exposes methods for accessing the CDM profile system by using the CDM object model.

An ASCX user control uses the other components to retrieve the image for the user, can be implemented using AJAX calls to have a smooth user interface, and can include picture caching. A delegate control can be used to replace the picker component. A modal dialog can be used by the picker component control to show the user control to the user.

A LOB tool can be utilized to share the consent changes with other LOB applications. The tool generates a spreadsheet file, which can then be imported into the LOB system. The file can be generated with all values or just the changes, capturing just the deltas. The tool calls the user profile service change log service to look for changes to the picture preference property. Once the changes are identified the application can then query the user profile web service to get additional data about those users in order to completely fill out a row in the spreadsheet file for that user.

The LOB tool can include a spreadsheet Helper Class, and a Profile Helper Class (shared from above). The tool integration can initially be implemented as a console application to be invoked by an OS scheduler.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
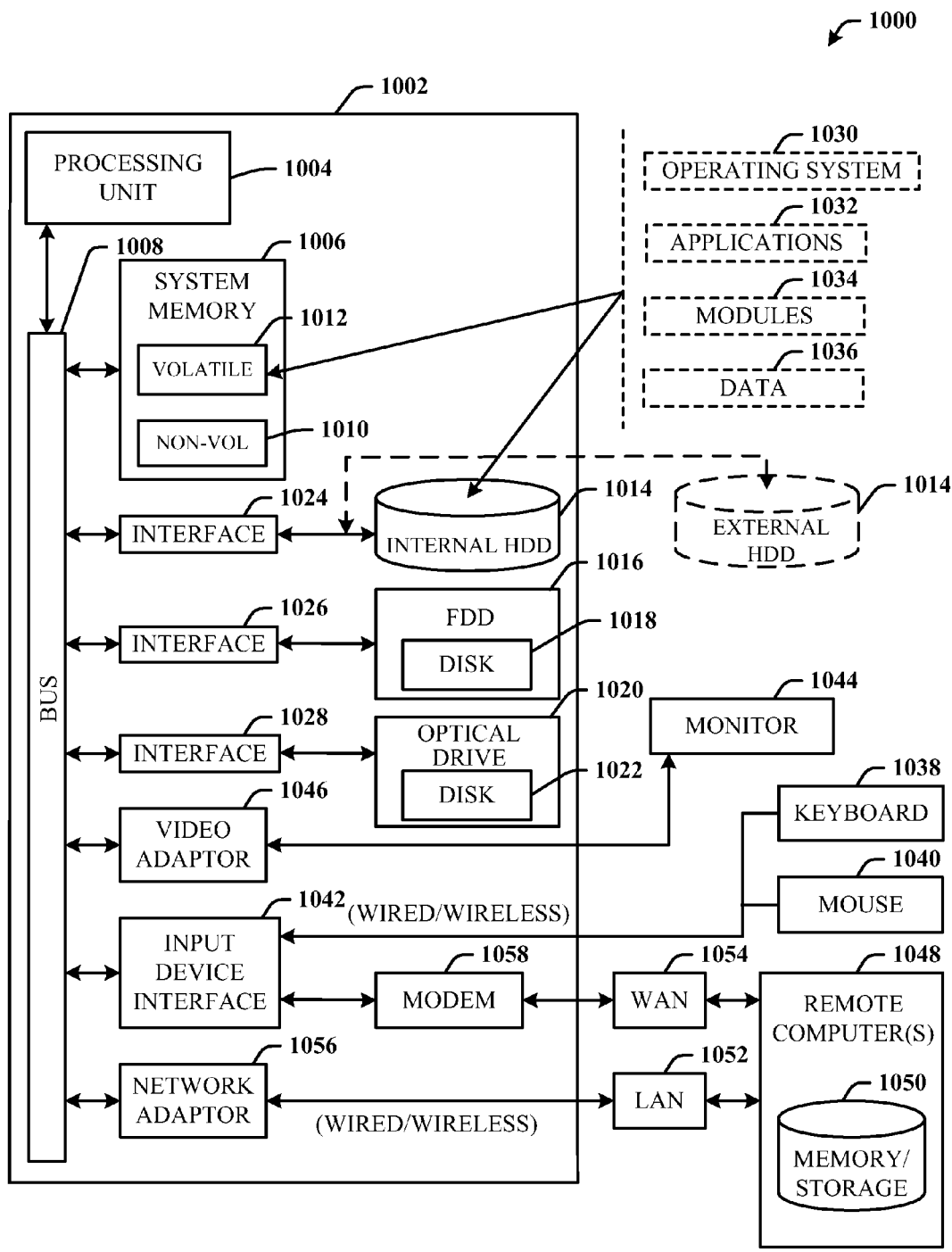
FIG. 10 illustrates a block diagram of a computing system operable to execute photo handling in accordance with the disclosed architecture.

Referring now to FIG. 10, there is illustrated a block diagram of a computing system 1000 operable to execute photo handling in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002 having a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 can include non-volatile memory (NON-VOL) 1010 and/or volatile memory 1012 (e.g., random access memory (RAM)). A basic input/output system (BIOS) can be stored in the non-volatile memory 1010 (e.g., ROM, EPROM, EEPROM, etc.), which BIOS are the basic routines that help to transfer information between elements within the computer 1002, such as during start-up. The volatile memory 1012 can also include a high-speed RAM such as static RAM for caching data.

The computer 1002 further includes an internal hard disk drive (HDD) 1014 (e.g., EIDE, SATA), which internal HDD 1014 may also be configured for external use in a suitable chassis, a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as a DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1012, including an operating system 1030, one or more application programs 1032, other program modules 1034, and program data 1036. Where the computer 1002 is employed as a server system, the one or more application programs 1032, other program modules 1034, and program data 1036 can include the share component 102, photos 104, security component 106, picker component 108, rules component 202, cleanup component 204, configuration manager 206, location CDM platforms (602, 604, and 606), associated sites (608, 612 and 616) and libraries (610, 614 and 618), for example.

All or portions of the operating system, applications, modules, and/or data can also be cached in the volatile memory 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, etc.

A monitor 1044 or other type of display device is also connected to the system bus 1008 via an interface, such as a video adaptor 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 11:
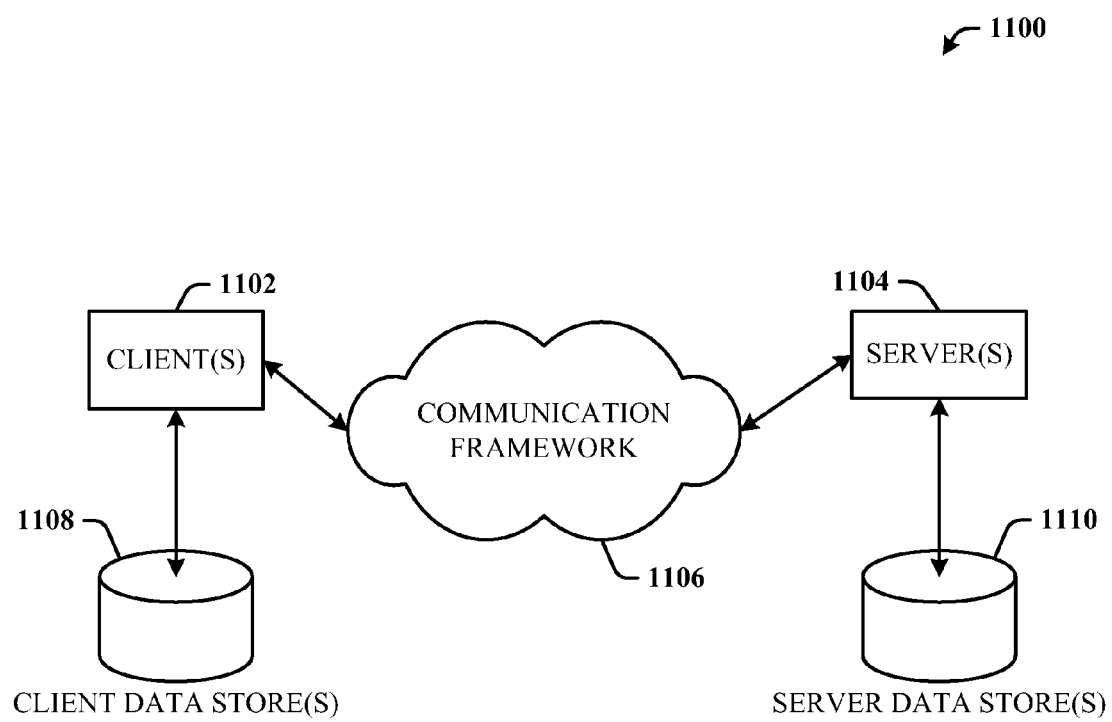
FIG. 11 illustrates a schematic block diagram of an exemplary computing environment that facilitates photo handling in accordance with the disclosed architecture.

Referring now to FIG. 11, there is illustrated a schematic block diagram of an exemplary computing environment 1100 that facilitates photo handling in accordance with the disclosed architecture. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented photo management system, comprising:
    a processing unit storing user photos as shared items in a collaboration and data management platform, applying security to the user photos according to consent criteria, receiving via user entry a uniform resource locator (URL) indicating a location of the user photos, receiving at least one photo from the user photos using the URL, and managing, based on the consent criteria, the user photos, the processing unit to implement a configuration list including a set of properties for sizing the user photos and control access to the configuration list via an application programming interface, the processing unit to allow an external application to access the user photos to select at least one photo for a security credential wherein the external application reads the URL and appends a web service call to the URL and allow an internal application to access the user photos via a service object model of the collaboration and data management platform wherein the internal application is internal to the collaboration and data management platform.

2. The system of claim 1, wherein receiving includes a user interface and shared components for uploading a photo from a card key database of the card key system.

3. The system of claim 1, wherein the user entry is accessible via a delegate control on a user profile page.

4. The system of claim 1, wherein receiving includes a configuration manager for reading configuration data from and writing configuration data to the collaboration list.

5. The system of claim 1, wherein the service object model is a profile service object model or a search query service object model.

6. The system of claim 1, further comprising migrating photos from a legacy or earlier version system to a new system, the migration based on conditions imposed by one or more business rules.

7. The system of claim 1, further comprising populating a store component with the user photos according to business rules.

8. The computer-implemented photo management system of claim 1 wherein the picker component is further configured to:
allow the external application to access the user photos to select the at least one photo for the security credential if the external application provides a correct location of a profile site in the collaboration and data management platform.

9. A computer-implemented photo management system, comprising:
a processing unit storing user photos as shared items in a collaboration and data management platform, applying security to the user photos in a share component according to consent criteria, receiving via user entry a URL indicating the location of a card key system, receiving at least one photo uploaded from the card key system, capturing the consent criteria for at least one photo uploaded from the card key system, and managing, based on the consent criteria, states of the user photos in the share component, where each state defines if a photo associated with that state is added to or removed from the share component, allowing an external application to access the at least one uploaded photo for inclusion in a card key by providing a web service connected to the collaboration and data management platform to the external application and allowing an internal application to access the at least one uploaded photo via a service object model of the collaboration and data management platform, to implement a configuration list including a set of properties for sizing the at least one uploaded photo, and controlling access to the configuration list via an application programming interface.

10. The system of claim 9, wherein the share component reads a user profile property to determine if the consent criteria indicate that user consent has been given.

11. The system of claim 10, further comprising a cleanup component for deleting a user photo in response to deletion of a user profile.

12. The system of claim 9, including a user interface and shared components for uploading a photo from a card key database of the card key system to the share component, the picker component is accessible via a delegate control on a user profile page.

13. The system of claim 9, wherein the service object model is a profile service object model or a search query service object model.

14. The system of claim 9, wherein the share component, security component, picker component, and cleanup component are part of a collaboration and data management server that hosts a user profile page in association with the stored user photos and facilitates distributed storage and retrieval of the photos.

15. A computer-implemented method of managing photos, comprising:
storing user photos as a library of shared photo items in a collaboration and data management platform;
applying security to the user photos in the library according to consent criteria;
receiving a uniform resource locator (URL) indicating the location of a security system;
receiving, via user entry, a uniform resource locator (URL) indicating a location of the library of shared photo items;
receiving at least one photo from a card key system using the URL;
capturing the consent criteria for the at least one photo
managing, based on the consent criteria, states of the stored user photos, where a state defines if a photo is added to or removed from the library;
implementing a configuration list including a set of properties for sizing the at least one photo
controlling access to the configuration list via an application programming interface;
exposing access to the at least one photo of the user photos to include in a security badge by an external application that reads the URL from an operating system registry and appends a web service call to the URL; and
exposing access to the user photos to an internal application that employs a service object model of the collaboration and data management platform, where the internal application is internal to the collaboration and data management platform.

16. The method of claim 15, further comprising capturing photo consent using a picker component to process access to the photos by other applications.

17. The computer-implemented method of claim 16 further comprising:
using asynchronous JavaScript and Extensible Markup Language (AJAX) to retrieve the photo from the card key system wherein the set of properties comprises at least a height property for the photo and a width property for the photo.

18. The method of claim 15, further comprising providing access to the card key system for upload of a security photo as a shared photo item.

19. The method of claim 15, further comprising storing and retrieving the user photos based on current user information.

20. The method of claim 15, further comprising uploading user photos based on accessible photo locations of a client provider and based on an external data source based on an external photo provider.

* * * * *